United States Patent
Burchardt et al.

(10) Patent No.: US 11,473,556 B2
(45) Date of Patent: Oct. 18, 2022

(54) ALIGNMENT DEVICE AND METHOD FOR ALIGNING MULTIPLE BEAMS FOR A SPAR CAP OF A WIND TURBINE BLADE OF A WIND TURBINE

(71) Applicant: Siemens Gamesa Renewable Energy A/S, Brande (DK)

(72) Inventors: Claus Burchardt, Gistrup (DK); Mogens Nielsen, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 79 days.

(21) Appl. No.: 16/838,424

(22) Filed: Apr. 2, 2020

(65) Prior Publication Data

US 2020/0318607 A1 Oct. 8, 2020

(30) Foreign Application Priority Data

Apr. 3, 2019 (EP) ..................... 19167148

(51) Int. Cl.
*F03D 1/06* (2006.01)
*F03D 13/10* (2016.01)
(Continued)

(52) U.S. Cl.
CPC .......... *F03D 1/0675* (2013.01); *B29C 66/721* (2013.01); *B29D 99/0028* (2013.01);
(Continued)

(58) Field of Classification Search
CPC ........ F01D 5/282; F03D 1/0675; F03D 1/065; F03D 1/0641; B29C 66/721; B29C 70/20;
(Continued)

(56) References Cited

U.S. PATENT DOCUMENTS 5,096,370 A * 3/1992 Mohr ..................... B65H 3/322
271/161
2017/0002792 A1 1/2017 Yarbrough et al.

FOREIGN PATENT DOCUMENTS

WO 2018091054 A1 5/2018

OTHER PUBLICATIONS

Extended European Search Report in related European Patent Application No. 19167148.6, dated Sep. 23, 2019. 5 pages.

* cited by examiner

Primary Examiner — Eric J Zamora Alvarez
(74) Attorney, Agent, or Firm — Schmeiser, Olsen & Watts LLP (57) ABSTRACT

An alignment device for aligning multiple beams for a spar cap of a wind turbine blade of a wind turbine with respect to each other is provided. The alignment device includes a support plate, which is configured so that the multiple beams can be placed on a top side of the support plate, two limit stops, which are configured to partially enclose the multiple beams, at least one bending apparatus attached to the support plate and configured to bend the support plate, a vibration apparatus attached to the support plate and/or the at least one bending apparatus, whereby the vibration apparatus is configured to vibrate the support plate and/or the bending apparatus, so that the multiple beams become aligned with respect to each other is provided. A method for aligning multiple beams for a spar cap of a wind turbine blade of a wind turbine is also provided.

15 Claims, 5 Drawing Sheets

(51) Int. Cl.
 *B29D 99/00* (2010.01)
 *B29C 65/00* (2006.01)
 *B29L 31/08* (2006.01)
(52) U.S. Cl.
 CPC ..... *B29L 2031/085* (2013.01); *B32B 2603/00* (2013.01); *F05B 2230/60* (2013.01); *F05B 2240/30* (2013.01); *F05B 2280/6003* (2013.01)
(58) Field of Classification Search
 CPC ... B29C 70/52; B29C 70/865; B29D 99/0028; B29L 2031/085; B32B 2603/00; F05B 2230/60; F05B 2240/30; F05B 2280/6003; F05B 2280/6013; F05B 2230/50
 See application file for complete search history.

ALIGNMENT DEVICE AND METHOD FOR ALIGNING MULTIPLE BEAMS FOR A SPAR CAP OF A WIND TURBINE BLADE OF A WIND TURBINE

CROSS-REFERENCE TO RELATED APPLICATIONS

This application claims priority to European Patent Application No. EP 19167148.6, having a filing date of Apr. 3, 2019, the entire contents of which are hereby incorporated by reference.

FIELD OF THE TECHNOLOGY

The following is directed to an alignment device and a method for aligning multiple beams for a spar cap of a wind turbine blade of a wind turbine. Moreover, the following is directed to a production line comprising at least two of such alignment devices.

BACKGROUND

Typically, a spar in the wind turbine blade comprises two spar caps and a spar web connecting the spar caps. The spar caps consist of multiple beams, which generally are elongate structures having high tensile strength. The beam may alternatively be referred to as a strip, a band, a laminate or a bar, for example. Such beams are stacked on top of one another to further increase the tensile strength and make the spar cap flexible against torsional load. For this purpose, it is common to not only stack such beams but also arrange multiple stacks consisting of the stacked beams next to each other in the spar caps. Thus, such a spar cap consists of multiple beams arranged on top of one another and adjacent to each other. Thereby, the spar cap becomes very flexible and can be twisted to a high degree without failure. This is particularly important for the operation of the wind turbine considering the high flapwise and edgewise loads that act upon the wind turbine blades of the wind turbine.

However, it has been found that alignment of the beams can be very difficult. This is in particular because the spar caps are not flat but designed with a curvature corresponding to the curvature of the wind turbine blade at the position at which the spar cap is being arranged. When aligning the beams relative to one another in the shape of a curvature, gaps are forming between adjacent beams. These gaps are weak points in the design of the spar caps. Moreover, due to the gaps, it is possible that the size accuracy of the spar cap manufactured at a later stage cannot be met. Therefore, it is an aspect of the present invention to eliminate or reduce such gaps between adjacent beams to a minimum.

This problem is solved by the subject-matter of the claims. Therefore, this object is solved by an alignment device for aligning multiple beams for a spar cap of a wind turbine blade of a wind turbine, a production line and a method a for aligning multiple beams for a spar cap of a wind turbine blade of a wind turbine. Thereby, the features and details described in connection with the alignment device of the present invention apply in connection with the production line of the present invention and the method according to the embodiment of the present invention and the other way around, so that regarding the disclosure of the individual aspects of the present invention it is or can be referred to one another.

SUMMARY

An aspect relates to an alignment device for aligning multiple beams for a spar cap of a wind turbine blade of a wind turbine with respect to each other, the alignment device comprising: (a) a support plate, which is configured so that the multiple beams can be placed on a top side of the support plate, (b) two limit stops, which are configured to partially enclose the multiple beams, (c) at least one bending apparatus attached to the support plate and configured to bend the support plate, and (d) a vibration apparatus attached to the support plate and/or the at least one bending apparatus, whereby the vibration apparatus is configured to vibrate the support plate and/or the bending apparatus, so that the multiple beams become aligned with respect to each other.

The limit stops are limiting the arrangement of the multiple beams to a target width corresponding to the width of the spar cap. Partially enclosing in particular means that the limit stops are engaging an arrangement of the multiple beams from the side. In other words, the limit stops are retaining the arrangement of the multiple beams in between them. The limit stops are arranged on a top side of the support plate. The limit stops may be arranged at a distance from one another, i.e. the target width, which corresponds to 90% to 110%, in particular 95% to 105% of the width of the spar cap to be manufactured. Thereby, the desired width of the spar cap to be manufactured can be achieved with high accuracy even considering shrinkage in the course of a curing process.

The at least one bending apparatus, at least two or exactly two bending apparatuses provide the curvature shape of the multiple beams, so that its shape is corresponding to the shape of the spar cap to be manufactured.

The vibration apparatus provides a vibration to the beams and thereby aligns them with respect to one another, effectively closing the otherwise formed gaps between adjacent beams. Thereby, the size accuracy of the spar cap is increased.

In particular, the multiple beams are provided on the top side of the support plate as at least two, at least three or exactly three adjacent stacks, wherein each of the stacks comprises at least two beams stacked on top of each other. The limit stops may be arranged at a distance from one another with may be a multiple of the width of a beam or the sum of the widths of adjacent beams. The multiple beams may be referred to as an arrangement of multiple beams.

In an exemplary embodiment of the present invention, the at least one bending apparatus is an extendable arm. The extendable arm can be extended and retracted so that the support plate is thereby bent and the arrangement of the multiple beams supported on the top side of the support is shaped with a curvature. The extendable arm may be a cylinder, a hydraulic cylinder or a cylinder driven by an electric motor.

In a further exemplary embodiment of the present invention, the at least one bending apparatus is attached to the support plate by means of at least one bending apparatus joint having at least one rotational degree of freedom, whereby at least one of the at least one rotational degree of freedom is with respect to a longitudinal axis of the support plate. The longitudinal axis of the support plate is an axis in which the support plate has its longest extension. The bending apparatus joint may in particular only have the rotational degree of freedom with respect to the longitudinal axis of the support plate. Thereby, the bending of the support plate can be controlled and undesired rotations or movements of the support plate are prevented.

In yet another exemplary embodiment of the present invention, the at least one bending apparatus is attached to a movable, wheeled, chassis. Thereby it is possible to easily move the alignment device from one place to another place.

The chassis may comprise or be a roll table, for example. The wheels may comprise a lock, i.e. be lockable, so that they cannot move once locked. This is particularly favorable in a production line according to the present invention, in which multiple alignment devices are arranged at a distance from one another in a direction along a common longitudinal axis of the support plates. For example, the distance between the alignment devices can be easily adjusted.

In yet a further exemplary embodiment of the present invention, the vibration apparatus is attached to the movable chassis and/or the vibration apparatus is attached to a bottom side of the support plate, whereby the bottom side of the support plate is opposite to the top side of the support plate. Thereby, a favorable arrangement of the vibration apparatus on the chassis and/or at the support plate can be arranged, so that the alignment device forms one movable unit. Further, the vibration apparatus thereby supports the support plate. In particular, the support plate may be supported by the vibration apparatus and/or the vibration apparatus joint. Alternatively, or additionally a rack can be attached to a bottom side of the support plate so as to support the support plate. The rack may be extendable. Thereby, it is prevented that the support plate becomes cracked when it is bent beyond its bending capacity. The vibration apparatus, the vibration apparatus joint and/or the rack may be positioned in a middle of the support plate.

In still another exemplary embodiment of the present invention, the vibration apparatus is attached to the support plate by means of at least one vibration apparatus joint having at least one rotational degree of freedom, whereby at least one of the at least one rotational degree of freedom is with respect to the longitudinal axis of the support plate. Thereby, the vibration of the support plate can be controlled to substantially move the support plate in the width direction. This is typically the direction of the adjacent beams in which the gaps occur and thus vibrating the support plate in this direction has been found to be the most effective. The vibration apparatus joint may in particular only have the rotational degree of freedom with respect to the longitudinal axis of the support plate. Thereby, undesired rotations or movements of the support plate in other directions, in which the gaps might become larger or additional gaps occur, are prevented.

In still a further exemplary embodiment of the present invention, at least one of the limit stops is connected to the support plate by means of an elastic member. The elastic member may be a spring, for example. In particular, the elastic member is adjusted with a retention force. The retention force keeps the arrangement of the multiple beams together but can be overcome by means of the vibration of the vibration apparatus, so that the beams are able to move in the width direction during the vibration operation of the vibration apparatus so that the undesired gaps can be closed. However, the retention force ultimately keeps the arrangement of the multiple beams at the target width, when the vibration operation is cancelled. Thereby, the gaps can be closed very effectively and a high size accuracy can be achieved. The retention force is applied on an upper part of the limit stops. Alternatively, or additionally the retention force may be larger on an upper part of the limit stops compared to a lower part of the limit stops. This ensures that a single beam cannot leave the arrangement of the multiple beams during vibration operation or bending operation.

In a moreover exemplary embodiment of the present invention, the alignment device further comprises a heating apparatus for heating and/or a vacuum bagging assembly for casting the multiple beams on top of the support plate. The width of the heating apparatus and/or the width of the vacuum bagging assembly in particular corresponds to a width of the arrangement of the multiple beams. Thereby, the casting of the spar cap can be directly applied on the support plate and by means of the alignment device. The alignment device can therefore also be referred to as a casting device. This simplifies the manufacturing of the spar cap because it is not necessary to move the arrangement of the multiple beams to another device.

According to a second aspect of the present invention, the embodiment relates to a production line comprising at least two alignment devices according to the first aspect of the present invention, whereby the at least two alignment devices are arranged at a distance from one another in a direction along a common longitudinal axis of the support plates of the at least two alignment devices, so that the beams can be placed on each of the support plates of the at least two alignment devices. Thereby, it is possible to provide a particularly inexpensive production line for aligning the multiple beams with respect to each other because the size of each of the alignment devices, in particular the support plates, can be kept small compared to a large single alignment device.

In an exemplary embodiment of the present invention, a vibration frequency of each of the vibration apparatuses of the at least two alignment devices are set to be different from one another and/or a height of the support plates of the at least two alignment devices is adjusted to be different from one another. By means of separately adjusting the vibration frequency for every alignment device, it becomes possible to provide different vibration operations at different positions of the arrangement of the multiple beams or spar cap to be manufactured, e.g. a root, middle-portion or tip of the spar cap. This may be beneficial when the middle-portion of a spar cap has larger gaps compared to the tip or root, for example and accordingly a vibration frequency of a vibration apparatus of the alignment device supporting the longitudinal middle-portion of the arrangement multiple beams is set to be higher than a vibration frequency of vibration apparatuses of alignment devices supporting the tip and root of the arrangement of the multiple beams. By adjusting the height of the support plates of the at least two alignment devices it becomes possible to provide the desired curvature of the spar cap from root to tip. For example, the height of the support plate of an alignment device arranged to support a middle-portion of the arrangement of the multiple beams may be set to be higher than a height of the support plate of an alignment device arranged to support a root of the arrangement of the multiple beams.

According to a third aspect of the present invention, the embodiment relates to a method for aligning multiple beams for a spar cap of a wind turbine blade of a wind turbine with respect to each other, the method comprising the steps of: (a) placing the multiple beams on a top side of a support plate of an alignment device and in between two limit stops of the alignment device, whereby the limit stops partially enclose the multiple beams, (b) aligning the multiple beams by means of at least one bending apparatus of the alignment device along a curve, whereby the bending apparatus is attached to the support plate and configured to bend the support plate, and (c) vibrating the support plate and/or the at least one bending apparatus, so that the multiple beams become aligned with respect to each other by means of a vibration apparatus of the alignment device, whereby the vibration apparatus is attached to the support plate and/or to the at least one bending apparatus.

The method may further include the step of heating and/or a vacuum resin molding the multiple beams. Thereby, a method of manufacturing a spar cap comprising the multiple beams is provided. In particular, the heating may be done by means of the aforementioned heating apparatus. The vacuum resin molding may be done by the aforementioned vacuum bagging assembly, for example. Thereby, the casting of the multiple beams to manufacture the spar cap can be directly performed after aligning the multiple beams with respect to each other. This simplifies the manufacturing of the spar cap because it is not necessary to move the arrangement of the multiple beams to another device.

In an exemplary embodiment of the present invention, the multiple beams are provided on the top side of the support plate as at least two adjacent stacks, wherein each of the stacks comprises at least two beams stacked on top of each other. In such an arrangement of multiple beams, there are particularly many gaps that can be introduced in between the multiple beams. Therefore, the embodiment performs particularly well in such an arrangement of the multiple beams.

In a further exemplary embodiment of the present invention, the multiple beams comprise composite materials, in particular carbon fiber-reinforced plastic. Composite have a high stiffness-to-weight ratio and thus are very susceptible to gaps formed in between an arrangement of such beams. Therefore, the embodiment performs particularly well with beams made from such material.

In another exemplary embodiment of the present invention, a vibration frequency of the vibration apparatus is set based on at least one of: a stiffness, a weight and/or a number of the multiple beams placed on top of the support plate. Because the vibration frequency based on at least one of the aforementioned characteristics is adjusted, it becomes possible to reduce the time of vibration operation time of the vibration apparatus and still get good results. Thereby, the entire processing time of the alignment process can be reduced.

In yet another exemplary embodiment of the present invention, the multiple beams are placed on at least two support plates of at least two alignment devices, whereby the at least two alignment devices are arranged at a distance from one another in a direction along a common longitudinal axis of the support plates of the at least two devices. In other words, the multiple beams are placed on the production line.

BRIEF DESCRIPTION

Some of the embodiments will be described in detail, with reference to the following figures, wherein like designations denote like members, wherein.

DETAILED DESCRIPTION

Same objects in FIGS. 1 to 6 are denominated with the same reference number. If there is more than one object of the same kind in one of the figures, the objects are numbered in ascending order with the ascending number of the object being separated from its reference number by a dot. The specific dimensions of features and parts in the figures are exemplary and may be enlarged for ease of reference only.

Figure 1:
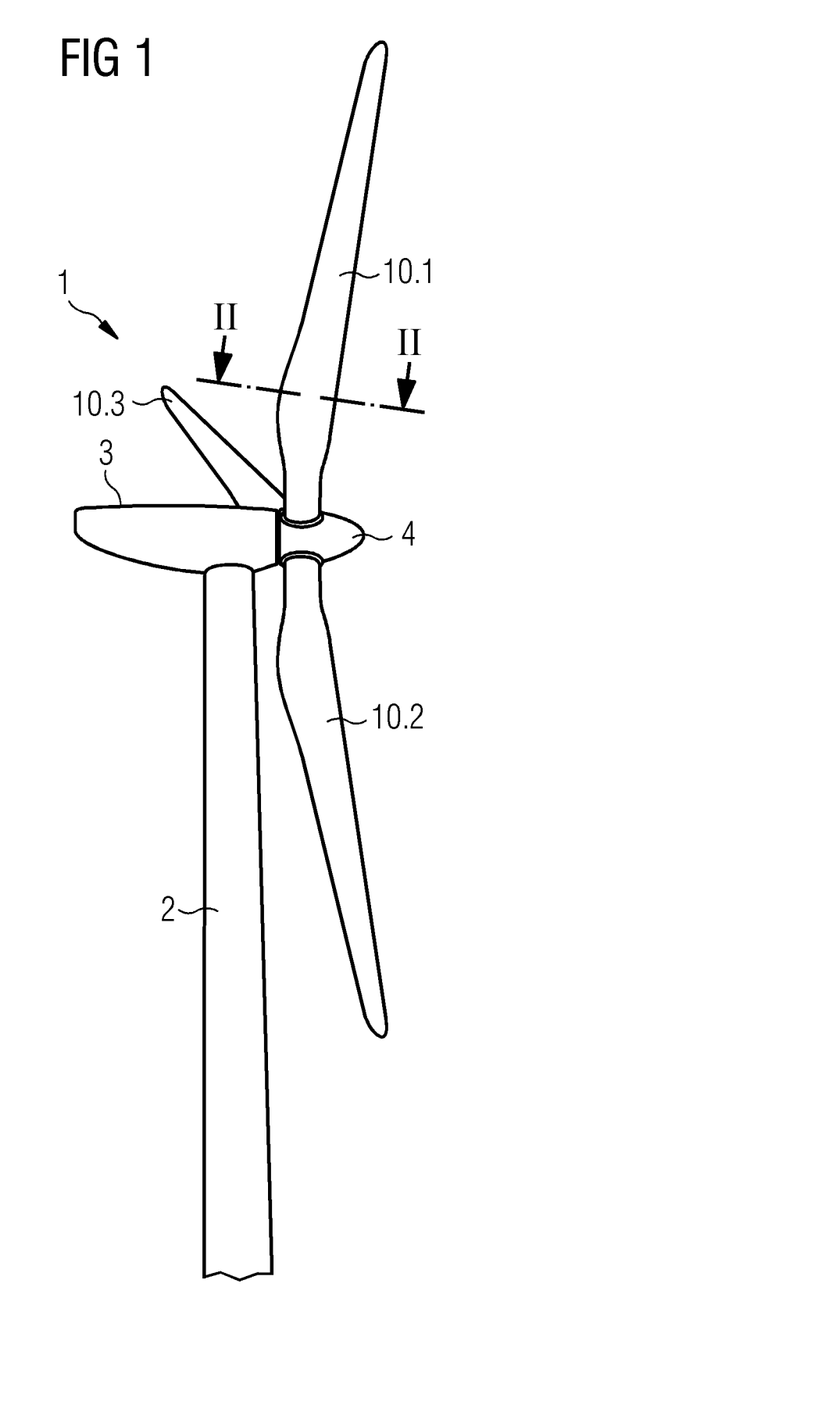
FIG. 1 depicts a side view on a wind turbine.

FIG. 1 is a side view on a wind turbine 1. The wind turbine 1 is provided with three wind turbine blades 10.1, 10.2, 10.3 attached to a hub 4 of the wind turbine 1, which is connected to a nacelle 3 of the wind turbine 1, the nacelle 3 being supported on a mast 2 of the wind turbine 1.

Figure 2:
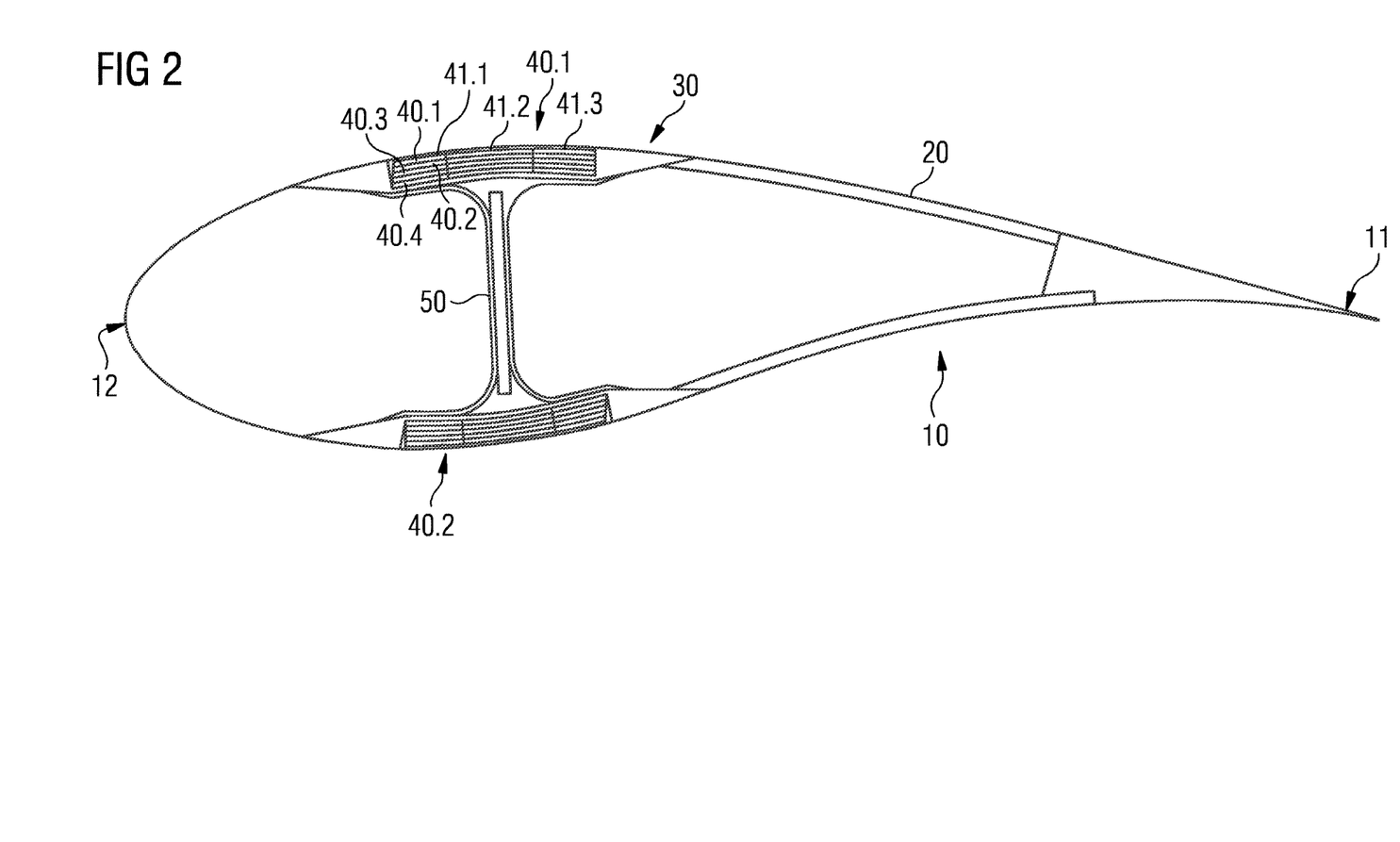
FIG. 2 depicts a sectional view along a transversal plane of a wind turbine blade of the wind turbine of FIG. 1.

FIG. 2 is a sectional view along the transversal plane of line II-II depicted in FIG. 1 of the wind turbine blade 10.1 of the wind turbine 1 of FIG. 1. The wind turbine blade 10 has a trailing edge 11 and a leading edge 12. The wind turbine blade 10.1 comprises a shell 20 and a spar 30. The spar 30 comprises two spar caps 40.1, 40.2. The two spar caps 40.1, 40.2 face each other and are connected to one another by means of a spar web 50. The spar cap 40.1 comprises three adjacent stacks 41.1, 41.2, 41.3 of four beams 42 each. The beams 42.1, 42.2, 42.3, 42.4 of the stack 41.1 are denominated. Each of the four beams 42 of the stacks 41.1, 41.2, 42.3 are stacked on top of one another.

Figure 3:
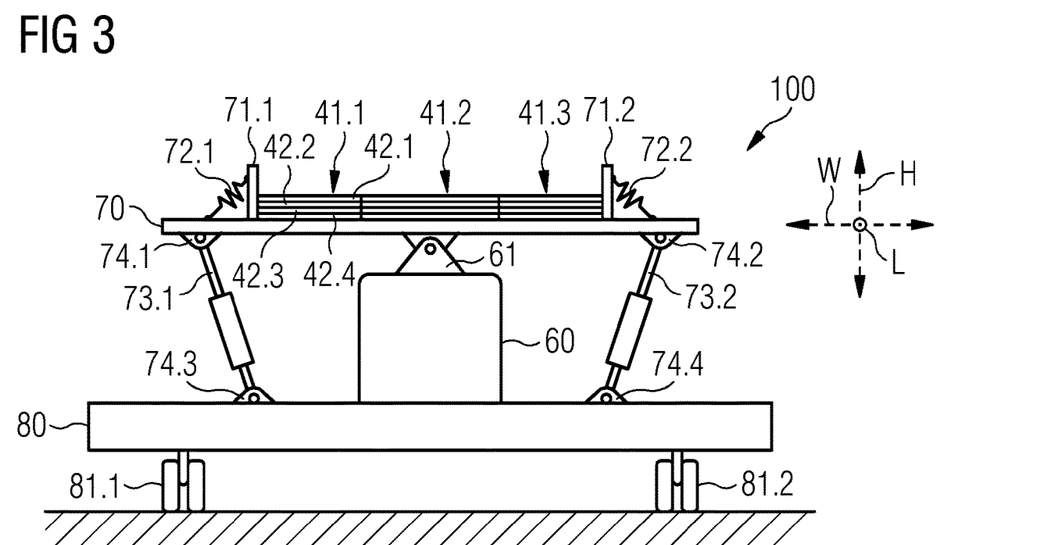
FIG. 3 depicts a front view on an embodiment of the alignment device.

FIG. 3 is a front view on an embodiment of the alignment device 100 according to the embodiment of the present invention. The alignment device comprises a wheeled chassis 80 on which a vibration apparatus 60 is supported. The wheeled chassis 80 is designed as a rolling table, in this particular embodiment. In this view, two wheels 81.1, 81.2 of the four wheels of the wheeled chassis 80 can be seen. A support plate 70 is attached to the wheeled chassis 80 by means of two bending apparatuses 73.1, 73.2, which are designed as extendable arms, in particular hydraulic cylinders in this particular embodiment. The bending apparatuses 73.1, 73.2, in particular their ends, are attached to the support plate 70 and the movable chassis 80 by means of bending apparatus joints 74.1, 74.2, 74.3, 74.4. The bending apparatus joints 74.1, 74.2, 74.3, 74.4 have a rotational degree of freedom with respect to a longitudinal axis L of the support plate 70. The longitudinal axis L is indicated by the coordinate system in the right portion of the FIG. 3. The coordinate system further indicates a height axis H and a width axis W of the support plate 70 and generally the alignment device 100.

A vibration apparatus 60 is attached to, in particular supported on, a top side of the wheeled chassis 80. The vibration apparatus 60 is further attached to a bottom side of the support plate 70 by means of a vibration apparatus joint 61 having a rotational degree of freedom with respect to the longitudinal axis L of the support plate 70.

Multiple beams 42 are provided on the top side of the support plate 70 as three adjacent stacks 41.1, 41.2, 41.3, wherein each of the stacks 41.1, 41.2, 41.3 comprises four beams 42 stacked on top of each other. This can clearly be seen from stack 41.1, in which the beams 42.1, 42.2, 42.3, 42.4 are denominated. The multiple beams 42 are made from carbon fiber-reinforced plastic and are prepregs, in this particular embodiment.

Two limit stops 72.1, 72.2 are attached to the support plate 70 at a distance along the width axis W from one another corresponding to the target width of the spar cap to be manufactured from the multiple beams 42. The limit stops 72.1, 72.2 thereby partially enclose the arrangement of the multiple beams 42. The limit stops 71.1, 71.2 are in particular connected to the support plate 70 by means of elastic members 72.1, 72.2. The elastic members 72.1, 72.2 are springs adjusted with a retention force and attached to an upper part of the limit stops 71.1, 71.2 in this particular embodiment.

Figure 4:
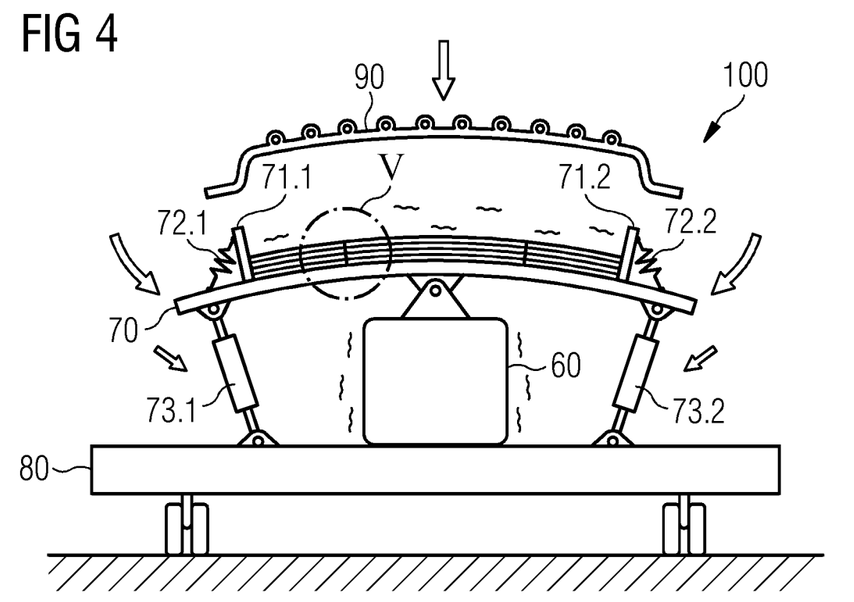
FIG. 4 depicts the alignment device of FIG. 3 in bending operation and vibration operation.

FIG. 4 is the alignment device 100 of FIG. 3 in bending operation and vibration operation. Here, the bending apparatuses 73.1, 73.2 have been retracted as being indicated by adjacent arrows, so that the support plate 70 has been bent. Thereby, the arrangement of the multiple beams 42 has been bent as well so that it corresponds to the curvature of the spar cap to be manufactured. By means of the vibration of the vibration apparatus 60 as being indicated by further adjacent arrows, the multiple beams 42 are vibrated and thereby aligned with respect to one another, while being held back by the retention of the limit stops 71.1, 71.2 provided by the elastic members 72.1, 72.2 to meet the target width.

After alignment, a heating apparatus 90 is provided on top of the multiple beams 42 as being indicated by another arrow. Thereby, the multiple beams 42 made from a prepreg can be heated and a curing process started directly on top of the support plate 70.

Figure 5:
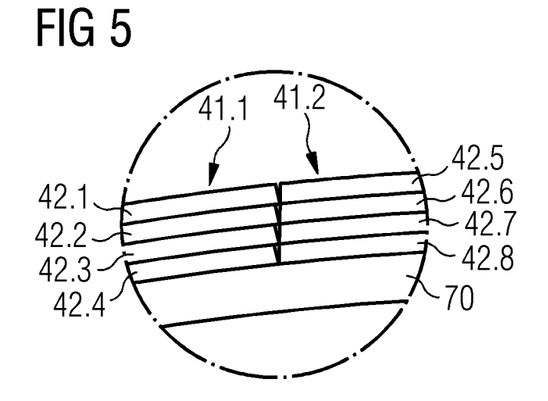
FIG. 5 depicts a detail view on the arrangement of the multiple beams in the alignment device of FIG. 4.

FIG. 5 is a detail view A on the arrangement of the multiple beams 42 in the alignment device 100 of FIG. 4. Here, the gaps formed between the adjacent beams 42.1 and 42.5, 42.2 and 42.6, 42.3 and 42.7, 42.4 and 42.8 can be seen. These gaps are eliminated or reduced significantly by means of the vibration operation.

Figure 6:
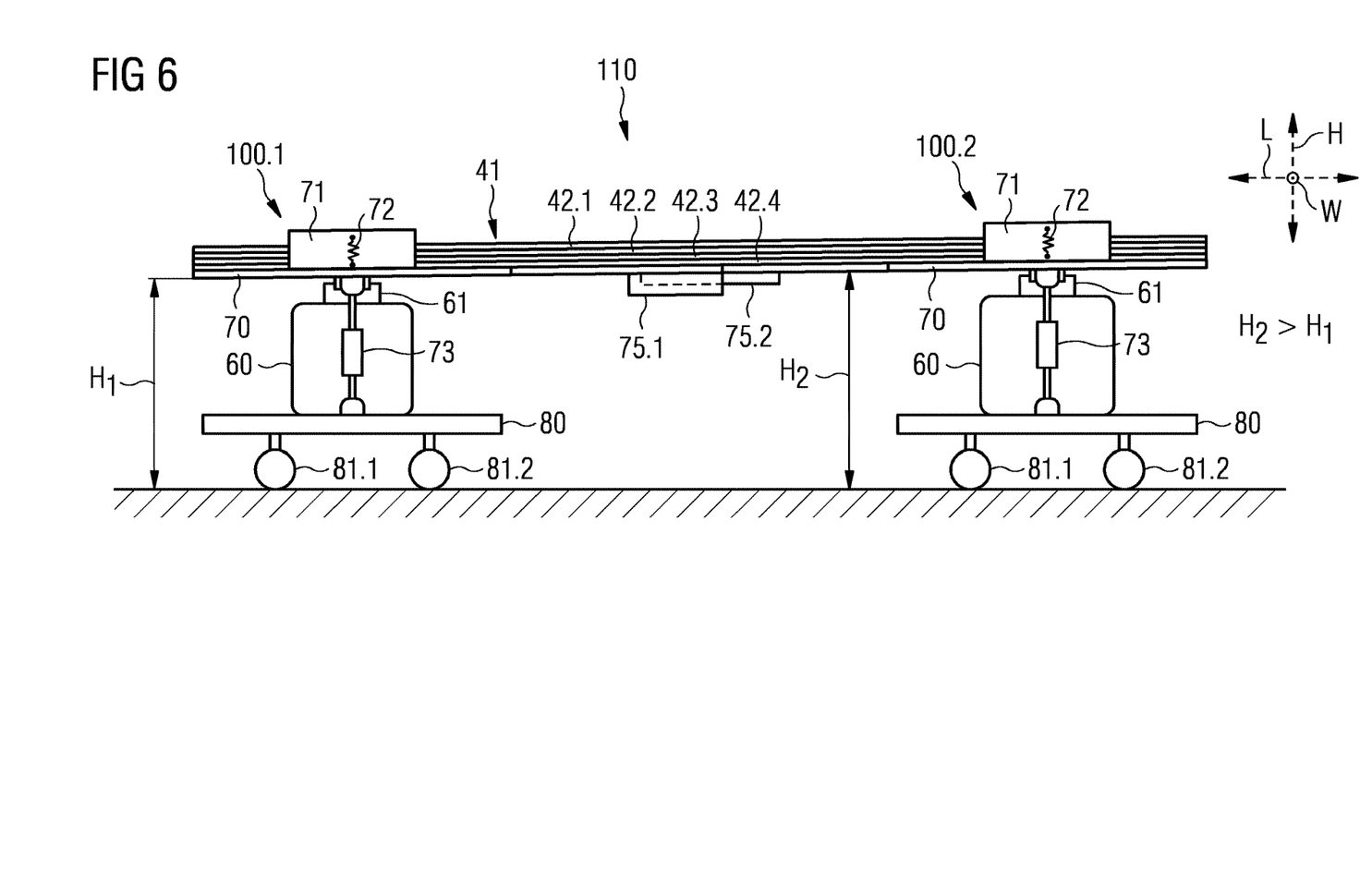
FIG. 6 depicts a side view on an embodiment of the production line.

FIG. 6 is a side view on an embodiment of the production line 110 according to the embodiment of the present invention. The production line 110 comprises two alignment devices 100.1, 100.2 arranged at a distance from one another in a direction along a common longitudinal axis L of the respective support plates 70. A stack 41 made from the multiple beams 42.1, 42.2, 42.3, 42.4 arranged on top of one another is placed on top of both alignment devices 100.1, 100.2, i.e. their support plates 70. There may be further stacks 41 arranged adjacent to the shown stack 41 on top of the support plates 70, which however, in this perspective cannot be seen. Each of the alignment devices 100.1, 100.2 is designed as previously described with regard to FIGS. 3 and 4. However, a height $H_1$ of the alignment device 100.1, i.e. a height measured from the floor to the top side of the support plate 70 along the indicated height axis H, is greater than a height $H_2$ of the alignment device 100.2. As shown in FIG. 6, the support plates 70 of the alignment devices 100.1, 100.2 are connected to one another by means of support plate attachment means 75.1, 75.2. Both support plate connection means 75.1, 75.2 are attached to an underside of their respective support plate 70. In this particular embodiment, the support plate connection means 75.2 is inserted into an opening of the support plate connection means 75.1. A locking mechanism (not shown) may be provided for further locking the support plate connection means 75.1, 75.2 with each other, so that the support plates 70 cannot move relative away from one another.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. An alignment device for aligning multiple beams for a spar cap of a wind turbine blade of a wind turbine with respect to each other, the alignment device comprising:
    a support plate, which is configured so that the multiple beams can be placed on a top side of the support plate;
    two limit stops, which are configured to partially enclose the multiple beams;
    at least one bending apparatus attached to the support plate and configured to bend the support plate; and
    a vibration apparatus attached to the support plate, whereby the vibration apparatus is configured to vibrate the support plate and/or the bending apparatus such that the multiple beams become aligned with respect to each other.

2. The alignment device according to claim 1, wherein the at least one bending apparatus is an extendable arm.

3. The alignment device according to claim 1, wherein the at least one bending apparatus is attached to the support plate by at least one bending apparatus joint having at least one rotational degree of freedom, whereby the at least one rotational degree of freedom is with respect to a longitudinal axis of the support plate.

4. The alignment device according to claim 1, wherein the at least one bending apparatus is attached to a movable, wheeled chassis.

5. The alignment device according to claim 4, wherein the vibration apparatus is attached to the movable, wheeled chassis and/or the vibration apparatus is attached to a bottom side of the support plate, whereby the bottom side of the support plate is opposite to the top side of the support plate.

6. The alignment device according to claim 1, wherein the vibration apparatus is attached to the support plate by at least one vibration apparatus joint having at least one rotational degree of freedom, whereby the at least one rotational degree of freedom is with respect to a longitudinal axis of the support plate.

7. The alignment device according claim 1, wherein at least one of the two limit stops is connected to the support plate by an elastic member.

8. The alignment device according to claim 1, further comprising a heating apparatus for heating.

9. A production line comprising at least two alignment devices according to claim 1, whereby the at least two alignment devices are arranged at a distance from one another in a direction along a common longitudinal axis of each support plate of the at least two alignment devices such that the multiple beams can be placed on each support plate of the at least two alignment devices.

10. The production line according to claim 9, wherein a vibration frequency of each vibration apparatus of the at least two alignment devices are set to be different from one another and/or a height of each support plate of the at least two alignment devices is adjusted to be different from one another.

11. A method for aligning multiple beams for a spar cap of a wind turbine blade of a wind turbine with respect to each other, the method comprising:
    placing the multiple beams on a top side of a support plate of an alignment device and in between two limit stops of the alignment device, whereby the two limit stops partially enclose the multiple beams;
    aligning the multiple beams by at least one bending apparatus of the alignment device, whereby the bending apparatus is attached to the support plate and configured to bend the support plate; and
    vibrating the support plate and/or the at least one bending apparatus such that the multiple beams become aligned with respect to each other by a vibration apparatus of the alignment device, whereby the vibration apparatus is attached to the support plate.

12. The method of claim 11, wherein the multiple beams are provided on the top side of the support plate as at least two adjacent stacks, wherein each of the stacks comprises at least two beams stacked on top of each other.

13. The method of claim 11, wherein the multiple beams comprise composite materials.

14. The method of claim 11, wherein a vibration frequency of the vibration apparatus is set based on at least one of: a stiffness, a weight and/or a number of the multiple beams placed on top of the support plate.

15. The method according to claim 11, wherein the multiple beams are placed on each support plate of at least two alignment devices, whereby the at least two alignment devices are arranged at a distance from one another in a direction along a common longitudinal axis of each support plate of the at least two alignment devices.

* * * * *